United States Patent
Hitchcock et al.

(10) Patent No.: US 9,754,100 B1
(45) Date of Patent: Sep. 5, 2017

(54) CREDENTIAL SYNCHRONIZATION MANAGEMENT

(71) Applicant: Amazon Technologies, Inc., Seattle, WA (US)

(72) Inventors: Daniel Wade Hitchcock, Bothell, WA (US); Darren Ernest Canavor, Redmond, WA (US); Jesper Mikael Johansson, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 358 days.

(21) Appl. No.: 14/580,043

(22) Filed: Dec. 22, 2014

(51) Int. Cl.
*G06F 21/00* (2013.01)
*G06F 21/45* (2013.01)
*H04L 9/32* (2006.01)

(52) U.S. Cl.
CPC ............ *G06F 21/45* (2013.01); *H04L 9/3268* (2013.01)

(58) Field of Classification Search
CPC ...................................................... G06F 21/45
See application file for complete search history.

(56) References Cited

U.S. PATENT DOCUMENTS

| | | | |
|---|---|---|---|
| 8,949,597 B1* | 2/2015 | Reeves | H04W 12/04 455/422.1 |
| 2009/0260057 A1* | 10/2009 | Laberteaux | H04L 63/0823 726/2 |
| 2015/0341325 A1* | 11/2015 | Al Jabri | H04L 63/0442 713/156 |

* cited by examiner

*Primary Examiner* — Jeffrey Pwu
*Assistant Examiner* — Thong Truong
(74) *Attorney, Agent, or Firm* — Thomas Horstemeyer, LLP

(57) ABSTRACT

Disclosed are various embodiments for replicating authentication data between computing devices. A computing device monitors a first certificate store located on a first client device for a change in a first state of the first certificate store. The computing device updates a record of the first state of the first certificate store with the change in the first state of the first certificate store, wherein the record is stored in a memory of the computing device. The computing device then determines that the first state of the first certificate store differs from a second state of a second certificate store located on a second client device. Finally, the computing device sends an update to the second client device, wherein the update comprises a change set representing a difference between the updated record and the second certificate store.

21 Claims, 6 Drawing Sheets

CREDENTIAL SYNCHRONIZATION MANAGEMENT

BACKGROUND

An application may require that users verify their identity or otherwise authenticate themselves before permitting continued use of the application. To verify their identity, users may be required to provide credentials (such as a user name and a password), a public key and a public key certificate, provide an answer to a question that only they should know, or some combination thereof. After the identity of the user is verified or authenticated, the application permits the user to continue using the application. Users may similarly be required to authenticate themselves or otherwise verify their identity when attempting to access specific data, such as files, databases, and/or other electronic records.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various embodiments for synchronizing authentication credentials and data, including digital certificates, authentication state data, and/or other data, across multiple user devices. For example, a user may install an instance of an authentication application on his or her personal computer and register his or her personal computer with a synchronization service. Subsequently, the user may install the authentication application on his or her smartphone and register his or her smartphone with the synchronization service. Changes to authentication credentials and data on the personal computer are replicated to the smartphone. For example, if a user has a certificate installed on his or her personal computer that allows him or her to logon to his or her employer's intranet, webmail, or VPN, this certificate could be replicated to user's smartphone in order for the user to logon to his or her employer's intranet, webmail or VPN with his or her smartphone using the same certificate. This may be quicker and/or more convenient than manually installing the certificate on each individual device of the user. In the following discussion, a general description of the system and its components is provided, followed by a discussion of the operation of the same.

Figure 1:
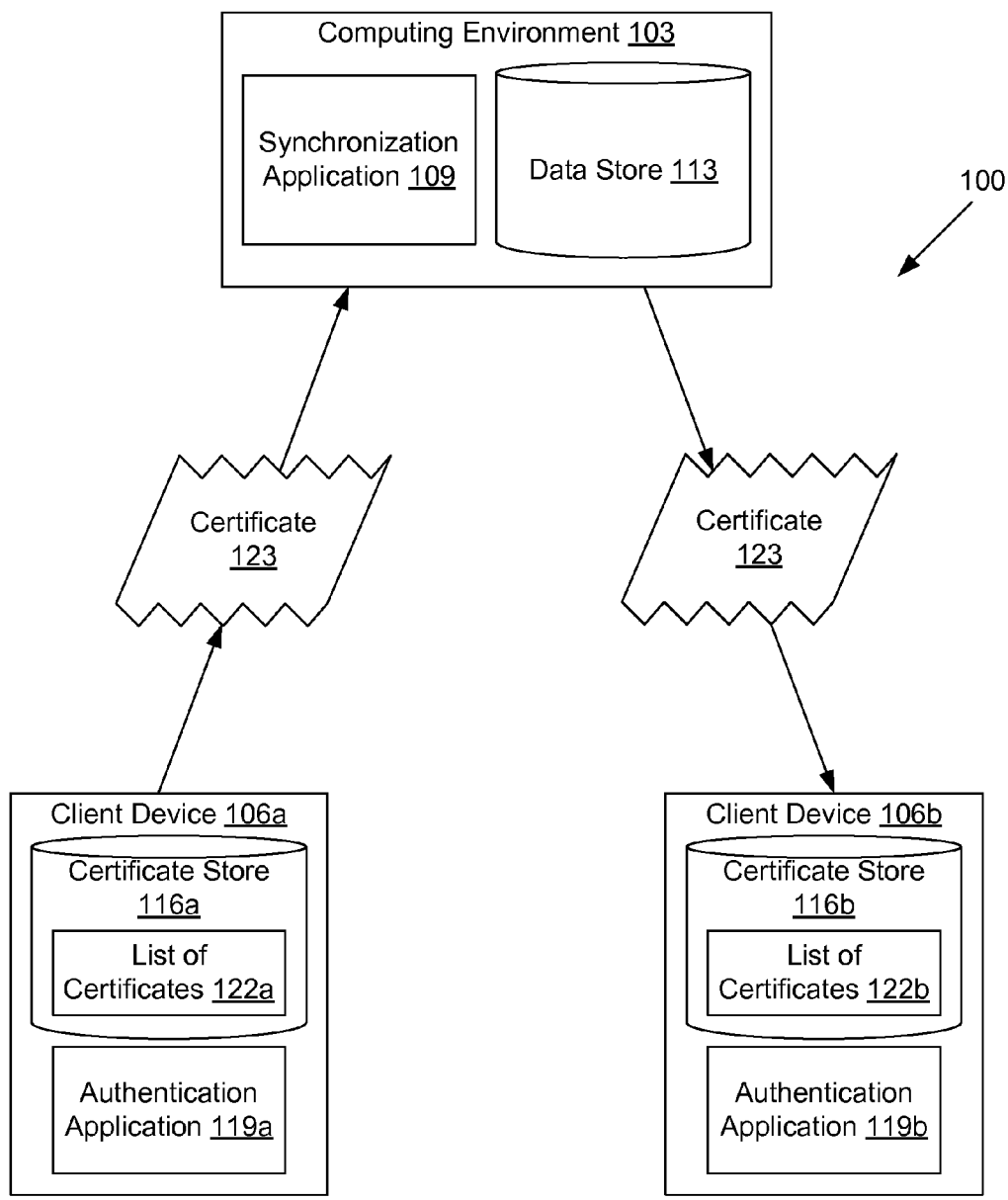
FIG. 1 is a drawing of an example of one of several various embodiments of the present disclosure.

With reference to FIG. 1, shown is a networked environment 100 according to various embodiments of the present disclosure. The networked environment 100 includes a computing environment 103 and multiple client devices 106, such as client device 106a and client device 106b. The computing environment 103 includes a synchronization application 109 and a data store 113. Each client device 106 includes a certificate store 116, such as certificate store 116a in client device 106a and certificate store 116b in client device 106b, stored in a memory of the client device 106 and an authentication application 119, such as authentication application 119a and authentication application 119b, executing on at least one processor of the client device 106. Within the certificate store 116 is a list of certificates 122 which represents individual certificates 123 that may be used by the client device 106, such as the list of certificates 122a stored in the certificate store 116a and the list of certificates 122b stored in the certificate store 116b.

Illustrated in FIG. 1 is the transfer of a certificate 123, such as an X.509 certificate or other cryptographic certificate, from client device 106a to client device 106b via the synchronization application 109, according to at least one embodiment of the present disclosure. A certificate 123 is added to the certificate store 116 of the first client device 106. An authentication application 119a detects the addition of the certificate 123 to the certificate store 116a, for example by periodically executing an application programming interface (API) call provided for interacting with the certificate store 116a to retrieve the list of certificates 122a currently stored in the certificate store 116 and determining whether retrieved list of certificates 122a differs between API calls. For example, if an identifier of a certificate 123 is present in the retrieved list of certificates 122a, but was not present in the previously retrieved list of certificates, then the After determining that a certificate 123 has been added to the certificate store 116 of the first client device 106, the authentication application 119 sends the certificate 123 to the synchronization application 109 executing in the computing environment 103. The authentication application 119 may, for example, provide an identifier, such as a machine identifier, an account name and password, or other authentication information, and a copy of the certificate 123 to the synchronization application 109. The identifier and certificate 123 may be sent to the synchronization application 109 using a version of the hypertext transfer protocol (HTTP), representational state transfer (REST) protocol, file transfer protocol (FTP), or similar protocol or variant thereof. In various embodiments, the connection may be secured using a version of the secure sockets layer protocol (SSL), the transport layer security protocol (TLS), or similar protocols for securing network connections.

The synchronization application 109 authenticates the identifier provided by the authentication application 119 of the first client device 106. If the identifier is valid, the synchronization application 109 stores the certificate in the data store 113 in association with the identifier.

Subsequently, the synchronization application 109 receives a request from the authentication application 119b executing on the client device 106b for a copy of the certificate 123. The request from the authentication application 119b may be made on a periodic basis according to a previously defined schedule. The request from the authentication application 119b may include the identifier in order for the synchronization application 109 to verify that the client device 106b and/or the authentication application 119b is authorized to receive a copy of the certificate 123. After authenticating the client device 106b and/or authentication application 119b, the synchronization application 109 sends the certificate 123 and/or a copy of the certificate 123 to the authentication application 119b. The certificate 123 may be sent to the authentication application 119b by the synchronization application 109 using a version of HTTP, the REST protocol, a version of FTP, or a similar protocol or variant thereof. In various embodiments, the connection may be secured using a version of the secure sockets layer protocol (SSL), the transport layer security protocol (TLS), or similar protocols for securing network connections. The authentication application 119b then stores the certificate 123 in the certificate store 116b of the client device 106b, for example by adding the certificate 123 to the list of certificates 122b, resulting in the state of the certificate store 116a on the client device 106a being replicated to the certificate store 116b on the client device 106b.

However, in some embodiments, the synchronization application 109 may send (i.e. "push") a copy of the certificate 123 to the authentication application 119b in response to receiving the certificate 123 from the authentication application 119a. In such embodiments, the synchronization application 109 may determine that the authentication application 119b has permission to synchronize credentials, such as the certificate 123, with the authentication application 119b. This determination may be made, for example, based upon a prior registration of the authentication application 119b with the synchronization application 109 or because the synchronization application 109 recorded a prior synchronization by the authentication application 119b with the authentication application 119a. In such embodiments, the synchronization application 109 may initiate a transfer of the certificate from the data store 113 in the computing environment 103 to the certificate store 116b on the client device 106b. The transfer my occur using a version of HTTP, the REST protocol, a version of FTP, or a similar protocol or variant thereof. In various embodiments, the connection may be secured using a version of the secure sockets layer protocol (SSL), the transport layer security protocol (TLS), or similar protocols for securing network connections. The authentication application 119b then stores the certificate 123 in the certificate store 116b of the client device 106b, for example by adding the certificate 123 to the list of certificates 122b, resulting in the state of the certificate store 116a on the client device 106a being replicated to the certificate store 116b on the client device 106b.

Although not depicted in FIG. 1, it should be noted that in some embodiments of the present disclosure, the transfer of the certificate 123 between client device 106a and client device 106b may occur as a direct transfer. In such embodiments, the authentication application 119a may be in communication with authentication application 119b, for example via BlueTooth®, near field communication (NFC), induction wireless, infrared wireless, Wi-Fi Direct®, and/or similar point-to-point wireless connections. The authentication application 119a and/or the authentication application 119b may determine that synchronization of the list of certificates 122a with the list of certificates 122b is necessary by comparing the identifier of each certificate 123 in the list of certificates 122a with the identifier of each certificate 123 in the list of certificates 122b. If an identifier for a certificate 123 in the list of certificates 122a is not present in the list of certificates 122b, then the authentication application 119a may transfer the identified certificate 123 to the authentication application 119b via the direct connection. The authentication application 119a may determine that the authentication application 119b is authorized to receive a copy of the certificate 123, for example, by determining that the authentication application 119b has the same identifier or authentication credentials stored on the client device 106b for use with the synchronization application 109 as are stored on the client device 106a or by requiring a user to explicitly authorize the transmission on client device 106a and/or client device 106b, such as by responding to a user interface prompt requesting permission to transfer the certificate 123 from the client device 106a to the client device 106b.

Figure 2:
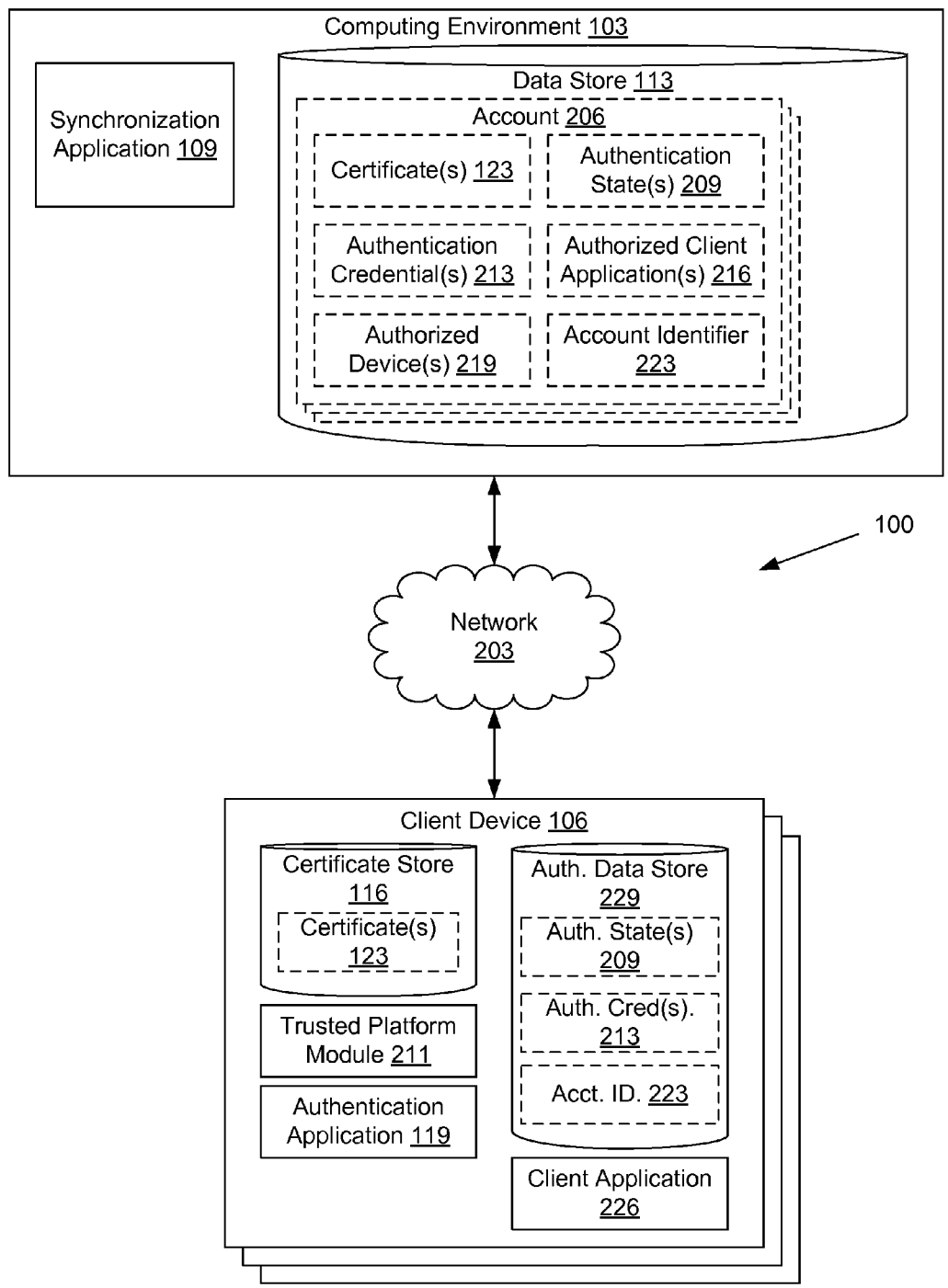
FIG. 2 is a drawing of a networked environment according to various embodiments of the present disclosure.

With reference to FIG. 2, shown is a networked environment 100 according to various embodiments. The networked environment 100 includes a computing environment 103 and one or more client devices 106, which are in data communication with each other via a network 203. The network 203 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 113 that is accessible to the computing environment 103. The data store 113 may be representative of a plurality of data stores 113 as can be appreciated. The data stored in the data store 113, for example, is associated with the operation of the various applications and/or functional entities described below.

The components executed on the computing environment 103, for example, include the synchronization application 109 and other applications, services, processes, systems, engines, or functionality not discussed in detail herein. The synchronization application 109 is executed to synchronize authentication credentials, such as public keys and/or public key certificates or similar credentials, and authentication state, such as authentication tokens and/or cookies or similar state tracking mechanisms, between client devices 106.

The data stored in the data store 113 includes, for example, accounts 206 and potentially other data. An account 206 may represent credential data associated with a user of the authentication application 119 and/or synchronization application 109 and/or a client device 106 executing the authentication application 119. For example, an account 206 may include one or more corresponding certificates 123, a corresponding authentication state 209, authentication credentials 213, a listing of authorized client applications 216, a listing of authorized devices 219, an account identifier 223, and other data. The credential data represented by the account 206 may correspond to credentials required by a service or application, such as a web service, web application, remote application, and/or similar service or application.

A certificate 123 represents a digital authentication credential, such as a public key, a public key certificate verifying the owner of a public key, a public/private key pair, and/or similar authentication credentials. In some embodiments, the certificate 123 may also include a scope of utility that defines the particular applications, services, and/or situations for which the certificate 123 may be used or is otherwise valid. A certificate 123 may be used as an authentication mechanism in user applications in place of or in addition to user names and passwords. A certificate 123 may also be used as a component of a communication protocol, such as the secure sockets layer (SSL) protocol, the transport layer security (TLS) protocol, the secure shell (SSH) protocol, and/or similar communication protocols. As an illustrative and non-limiting example, a certificate may correspond to a certificate complying with a version of the X.509 standard or similar standard.

The authentication state 209 represents whether the client device 106 has been previously authorized to access a particular application or service. The authentication state 209 may reflect a cookie or similar authentication token having been previously placed on the client device 106 to indicate a successful prior authentication of the client device 106 with the particular application or service. In some embodiments, the authentication state 209 may also include a scope of utility that defines particular applications, services, and/or situations for which the authentication state 209 may be used or is otherwise valid. For example, various network based or web based applications may store a cookie in a cookie store of a browser to indicate that the browser has previously successfully authenticated itself (e.g. logged in to a web application) with the particular application or service and therefore future authentications of the client device 106 are unnecessary. Further, the cookie may include an indication that the cookie may only be used in the web based application that caused the cookie to be stored on the client device 106.

In some embodiments, the authentication state 209 may include data derived from a trusted platform module (TPM) 211 on the client device 106. The TPM 211 may correspond to a secure cryptoprocessor that secures hardware by integrating cryptographic keys into devices. These cryptographic keys may normally be difficult, if not impossible, to extract from the TPM 211 of a client device 106. Therefore, cryptographic keys in the TPM 211 may be used, in some embodiments, to sign messages sent from the client device 106. These signed messages may be copied and stored as authentication state 209. When synced across multiple devices this would allow a second client device 106 to authenticate itself as if it were a first client device 106 by sending copies of signed authentication tokens, responses, and similar messages originally signed by the first client device 106.

The authentication credentials 213 represent authentication data other than certificates 123. Authentication credentials 213 may, for example, correspond to username or account name and password combinations for specific services and/or applications. Authentication credentials 213 may also include data necessary to synchronize one-time-pad and/or one-time-password authentication schemes, such as those found in various two-factor authentication approaches. For example, the authentication credentials 213 may specify a particular pseudorandom number generator (PRNG) to be used and an initial seed value or number to be supplied to the PRNG. Further, authentication credentials 213 may include their corresponding scope of utility that defines particular applications, services, and/or situations for which the authentication credentials 213 may be used or are otherwise valid. For example, a username and password combination may further specify that they are only to be used with a particular web application or service or may only be accessed or submitted by a particular client application 226.

The listing of authorized applications 216 represents client applications 226 that are authorized to access credential data of an account 206 and/or cause an account 206 to be modified, as will be further described herein. The listing of authorized applications 216 may represent a list of names of client applications 226 (e.g. "MyWebBrowser.exe," "MyVPN.exe," "MyChatApp.exe," etc.). The listing of authorized applications 216 may also represent a listing of digital signatures of individual client applications 226, such as the output of a cryptographic hash function which is supplied to the binary client application 226 as an input. In such embodiments, changing a name of a client application 226 from that of an unauthorized client application 226 to that of an authorized client application 226 would fail to convert an unauthorized client application 226 into an authorized client application 226 because the digital signature of the unauthorized client application 226 would remain unchanged.

The listing of authorized devices 219 represents those client devices 106 which are authorized to send data to and receive data from the synchronization application 109 related to an account 206. The listing of authorized devices 219 may, in various embodiments, represent a listing of unique hardware identifiers that uniquely identify individual client devices 106, such as media access control (MAC) addresses, component serial numbers, and/or similar identifiers. The listing of authorized devices 219 may, in various embodiments, also represent a list of previously generated identifiers stored on individual client devices 106 to uniquely identify client devices 106. Such previously generated identifiers may include a browser cookie, a universal unique identifier (UUID), a globally unique identifier (GUID), and/or similar identifiers.

The account identifier 223 represents a unique identifier for the account 206 to distinguish an account 206 from other accounts. The account identifier 223 may correspond to a user name, a machine name, an account number, and/or a similarly unique identifier for the account 206. In some embodiments, an account 206 may have multiple account identifiers, such as a user name, a machine name, and an account number, or some subcombination thereof. In such embodiments, each client device 106 attempting to access data of the account 206 may rely upon a unique account identifier 223 specific to the client device 106, such as a machine or client device 106 specific identifier. In such embodiments, this permits tracking which client device 106 is accessing the account 206 based upon the account identifier 223 supplied by the client device 106. In various embodiments of the present disclosure, the account identifier 223 may also represent a combination of a unique identifier for the account and an authorization or access credential, such as a password, authorization token, cryptographic key, or similar access credential.

The client device 106 is representative of a plurality of client devices that may be coupled to the network 203. The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display. The display may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may be configured to execute various applications such as a client application 226 and/or other applications. The client application 226 may be executed in a client device 106, for example, to access network content served up by the computing environment 103 and/or other servers, thereby rendering a user interface on the display of the client device 106. To this end, the client application 226 may comprise, for example, a browser, an email application, a social networking application, a word processor, a spreadsheet, a media player, and/or other applications, etc., and the user interface may comprise a network page, an application screen, etc.

The client device 106 may also be configured to host one or more data stores. For example, the client device 106 may be configured to host a certificate store 116. The client device 106 may also be configured to host an authentication data store 229. Although FIG. 2 depicts the certificate store 116 and the authentication data store 229 as being separate data stores, in some embodiments, the functionality of the certificate store 116 and the authentication data store 229 may be merged into a single data store, such as a credential store or similar data store.

The certificate store 116 represents a secure storage mechanism for storing one or more certificates 123. In various embodiments, the certificate store 116 may be provided by an operating system of the client device 106. In such embodiments, access to certificates 123 in the certificate store 116 may be provided through an application programming interface (API) made available by the operating system of the client device 106. In various embodiments, the certificate store 116 may also be provided and/or managed by the authentication application 119 directly. In such embodiments, the certificate store 116 may be one of a plurality of certificate stores 116 and the location of the certificate store 116 may be configurable via a setting of the authentication application 119.

The authentication data store 229 represents a secure storage mechanism for authentication data accessible to a client application 226 via the authentication application 119. In some embodiments, the structure and functionality of the authentication data store 229 may be merged with the certificate store 116. In other embodiments, the structure and functionality of the authentication data store 229 may be separate from the certificate store 116. In such embodiments, the certificate store 116 may, for example, correspond to a certificate store 116 provided by the client application 226, such as a browser certificate store 116, or a certificate store provided by the operation system of the client device 106, such as the Windows® certificate store 116. Stored in the authentication data store 229 may be an authentication state 209 of the client device 106 and/or client application 226, authentication credentials 213, and/or other data.

Next, a general description of the operation of the various components of the networked environment 100 is provided. To begin, the authentication application 119 is installed on the client device 106 and is provided with an account identifier 223. The account identifier 223 may, in some embodiments, been previously created as part of an initial registration process or have been created and/or assigned during the installation process. The authentication application 119 queries the certificate store 116 to identify the certificates 123 stored in the certificate store 116. The authentication application 119 may also query the authentication data store 229 to identify one or more authentication states 209 and authentication credentials 213 stored in the authentication data store 229.

The authentication application 119 then sends an initial query, via an encrypted connection, to the synchronization application 109. The initial query includes the account identifier 223, the list of certificates 123 installed in the certificate store 116, the various authentication states 209, the various authentication credentials 213 stored in the authentication data store, and an indication that the query is the first query from a newly installed instance of the authentication application 119.

The synchronization application 109 validates the initial query from authentication application 119. The synchronization application 109 may, for example determine that the client device 106 is in the list of authorized devices 219. The synchronization application 109 may also determine whether the account identifier 223 provided by the authentication application 119 matches the account identifier 223 of the account 206. Other validation approaches may also be used by the synchronization application 109.

The synchronization application 109 subsequently synchronizes the certificates 123 in the certificate store 116 with the certificates 123 stored with the account 206 in the data store 113. The synchronization application 109 may update the account 206 record by adding to the account 206 any certificates in the certificate store 116 that were not already associated with the account 206. The synchronization application 109 may also send to the authentication application 119 any certificates 123 stored with the account 206 that were not already present in the certificate store 116 of the client device 106. The synchronization application 109 may take similar actions to synchronize the authentication state 209 and authentication credentials 213 stored in the authentication data store 229 with the authentication state 209 and authentication credentials 213 stored in conjunction with the account 206.

The authentication application 119 then monitors the certificate store 116 and the authentication data store 229 for changes to the certificates 123, authentication state 209, and/or authentication credentials 213. The authentication application 119 subsequently reports any changes that are detected to the synchronization application 109. The synchronization application 109 updates the account 206 in response to the changes reported by the authentication application 119.

The synchronization application 109 also tracks when changes are made to the account 206, either by the synchronization application 109 itself or through some other mechanism. Any changes that are detected are reported to client devices 106. This allows for changes made to data stored in the certificate store 116 or authentication data store 229 on one client device 106 associated with an account 206 to be propagated to another client device 106 associated with the account 206. These changes may be pushed to an authentication application 119 on client device 106 or may be reported to an authentication application 119 on a client device 106 in response to a status query (e.g., polling by the authentication application 119). Changes to the account 206 that are reported may include, for example, addition or deletion of certificates 123 stored with the account 206, changes to the authentication state 209 stored with the account 206, addition or deletion of authentication credentials 213 stored with the account 206, and/or similar changes. This may, for example, allow users to synchronize their authentication data, such as certificates 123, authentication state 209, authentication credentials 213, and/or similar authentication data, across multiple client devices 106.

In addition, the authentication application 119 may provide a client application 226 with access to certificates 123 in the certificate store 116 and/or authentication state 209 and/or authentication credentials in the authentication data store 229. The client application 226 may use a function call for an application programming interface (API) provided by the authentication application 119 to request the certificate 123, authentication state 209, and/or authentication credentials 213.

However, in some embodiments, data for the accounts 206 may be stored in an encrypted form that is inaccessible and/or may not be decryptable by the synchronization application 109. In such embodiments, synchronization of the certificates 123, authentication states 209, authentication credentials 213, authorized client applications 216, and authorized devices 219 may be handled in other manners. For example, the authentication application 119 may bear the responsibility of synchronizing data between the certificate store 116 and/or authentication data store 229 on the client device 106 and the data store 113 in the computing environment 103.

In such embodiments, the authentication application 119 may download all account 206 data from the data store 113 and decrypt it on the client device 106. The authentication application 119 may then identify any discrepancies between the downloaded certificates 123, authentication states 209, and authentication credentials 213, and the locally stored certificates 123, authentication states 209, and authentications credentials 213 on the client device 106. In such embodiments, the authentication application 119 may resolve any discrepancies locally on the client device 106, and then encrypt and upload a new version of the data for the account 206. To prevent race conditions between multiple instances of the authentication applications 119, the synchronization application 109 may lock the user account 206 until it is updated or otherwise marked as current by the instance of the authentication application 119 that downloaded the data for the account 206.

Figure 3:
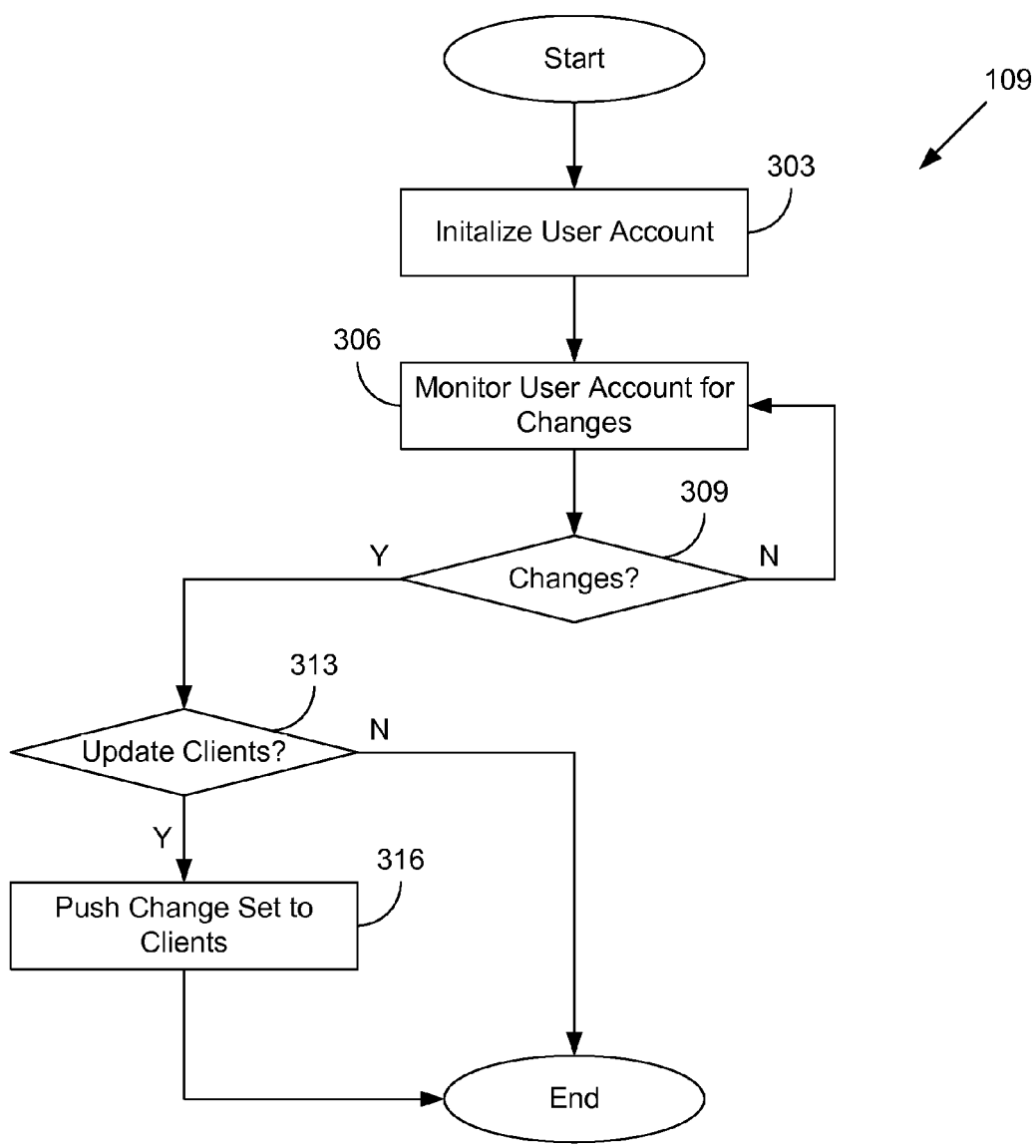
FIG. 3 is a flowchart illustrating one example of functionality implemented as portions of an application executed in a computing environment in the networked environment of FIG. 2 according to various embodiments of the present disclosure.

Referring next to FIG. 3, shown is a flowchart that provides one example of the operation of a portion of the synchronization application 109 according to various embodiments. It is understood that the flowchart of FIG. 3 provides merely an example of the many different types of functional arrangements that may be employed to implement the operation of the portion of the synchronization application 109 as described herein. As an alternative, the flowchart of FIG. 3 may be viewed as depicting an example of elements of a method implemented in the computing environment 103 (FIGS. 1 & 2) according to one or more embodiments.

Beginning with box 303, the synchronization application 109 initializes the account 206 (FIG. 2) with data provided in an initial query or message from an authentication application 119 (FIGS. 1 & 2) executing on a first client device 106 (FIGS. 1 & 2). The data may include, for example, an account identifier 223 (FIGS. 1 & 2) as well as one or more certificates 123 (FIGS. 1 & 2) located in a certificate store 116 (FIGS. 1 & 2) of the first client device 106, one or more authentication states 209 (FIGS. 1 & 2) of the first client device 106, one or more authentication credentials 213 (FIGS. 1 & 2), and/or other data. The synchronization application 109 then stores the received certificates 123, authentication states 209 and/or authentication credentials 213 in association with the account 206. The synchronization application 109 may, for example, execute or process a structured query language (SQL) statement, create a replacement key-value pair to reflect the additional data, and/or perform other similar data operations to update the record for the account 206 in the data store 113 (FIGS. 1 & 2). If the account 206 does not yet exist, the synchronization application may create a new account 206 using the account identifier 223 and other data included in the initial query or message.

Proceeding next to box 306, the synchronization application 109 monitors the account 206 for changes. The account 206 may for example, have been modified by another process, instance, and/or thread of the synchronization application 109. In some embodiments, the account 206 may have been manually modified or modified by another application executing in the computing environment 103. To monitor the account 206, the synchronization application 109 may, for example, periodically poll, query, or otherwise check the state of the account 206.

Moving on to box 309, the synchronization application 109 determines whether the account 206 has been modified or changed. The synchronization application 109 may, for example, determine that the account 206 has been changed by comparing the account 206 to a temporary copy of the account 206 stored in memory by the synchronization application 109. If there is a mismatch between the account 206 in the data store 113 and the temporary copy of the account 206 stored in memory, then the synchronization application 109 may determine that the account 206 has been modified. In another embodiment, the account 206 may include a flag that represents whether the account 206 has been modified. If the flag is set to the unmodified state, then the synchronization application 109 may determine that the account 206 has not been modified. However, if the flag is set to the modified state, then the synchronization application 109 may determine that the account 206 has been modified. If the synchronization application 109 determines that the account 206 has been modified, then execution proceeds to box 313. If the synchronization application 109 determines that the account 206 has not been modified, then execution loops back to box 306.

Referring next to box 313, the synchronization application 109 determines whether additional client devices 106 need to be updated to reflect the changes made to the account 206. The synchronization application 109 may, for example, send a query to each authentication application 119 that connects to the synchronization application 109, wherein the query requests that the authentication application 119 send the current state of the certificate store 116 and authentication data store 229 (FIGS. 1 & 2) on the client device 106. If the synchronization application 109 determines, based at least in part on a comparison between the account 206 and the data provided by the authentication application 119 in response to the query of the synchronization application 109, that the data in the certificate store 116 and/or the authentication data store 229 on the client device 106 does not match the corresponding data of the account 206, then the synchronization application 109 may determine that the client device 106 needs to be updated. If no client devices 106 need to be updated, then the previously described path of execution of the synchronization application 109 subsequently ends. Otherwise, execution of the synchronization application 109 proceeds to box 316.

Proceeding next to box 316, the synchronization application 109 pushes a change set to the authentication application 119 on the client device 106 to use to update the certificate store 116 and/or authentication data store 229 on the client device 106. The change set may be sent directly by the synchronization application 109 or in response to a request from the authentication application 119 for the change set. The change set may include, for example, one or more certificates 123 to be added to the certificate store 116, an authentication state 209 to be added to the authentication data store 229, authentication credentials 213 to be added to the authentication data store 229, an identifier of a certificate 123 to be removed from the certificate store 116, an identifier of an authentication state 209 to be removed from the authentication data store 229, an identifier of one more authentication credentials 213 to be removed from the authentication data store 229, and/or other data. Where a certificate 123, authentication state 209, or authentication credential 213 is to be modified, the change set may include the necessary data to remove the previous version of the certificate 123, authentication state 209, or authentication credential 213 and to add a new certificate 123, authentication state 209, or authentication credential 213 in its place. After the change set is sent, the previously described path of execution of the synchronization application 109 ends.

Figure 4:
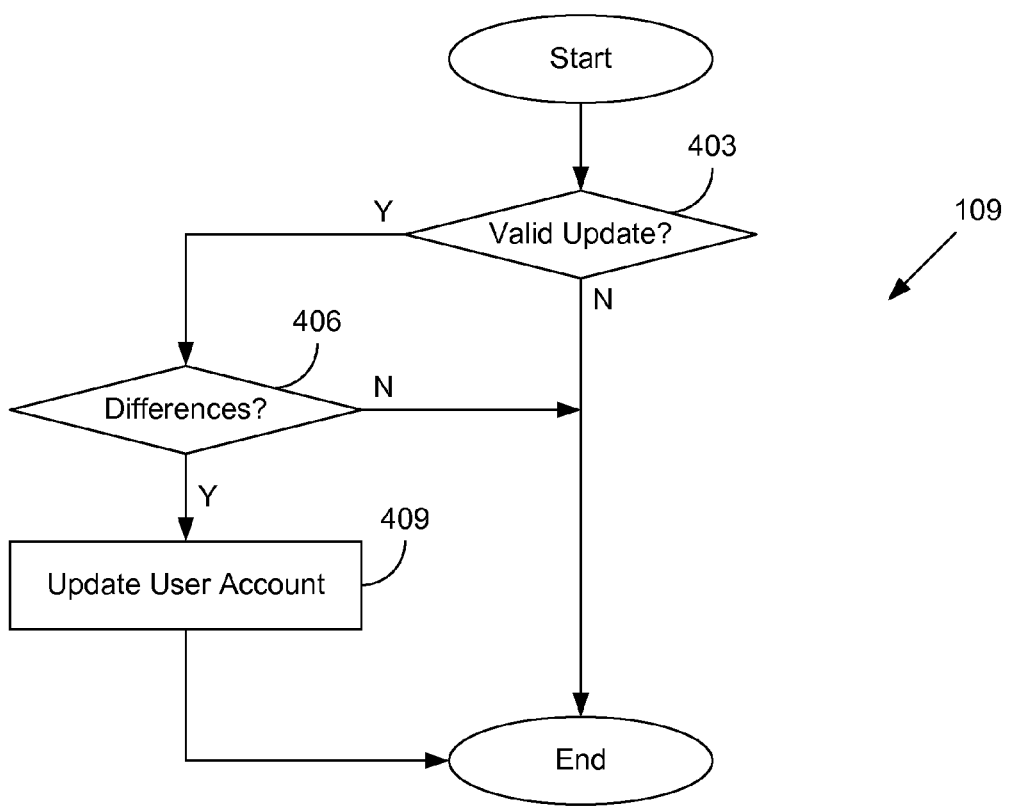
FIG. 4 is a flowchart illustrating one example of functionality implemented as portions of an application executed in a computing environment in the networked environment of FIG. 2 according to various embodiments of the present disclosure.

Referring next to FIG. 4, shown is a flowchart that provides one example of the operation of a portion of the synchronization application 109 according to various embodiments. It is understood that the flowchart of FIG. 4 provides merely an example of the many different types of functional arrangements that may be employed to implement the operation of the portion of the synchronization application 109 as described herein. As an alternative, the flowchart of FIG. 4 may be viewed as depicting an example of elements of a method implemented in the computing environment 103 (FIGS. 1 & 2) according to one or more embodiments.

Beginning with box 403, the synchronization application 109 determines whether an update for the account 206 (FIG. 2) received from an authentication application 119 (FIGS. 1 & 2) executing on a client device 106 (FIGS. 1 & 2) is valid. The synchronization application 109 may, for example, determine whether the client device 106 is included in the authorized devices 219 (FIGS. 1 & 2) for the account 206. In various embodiments, the synchronization application 109 may compare a MAC address of a network card of the client device 106 to a MAC address identified in the list of authorized devices 219 for the account 206. If the MAC address of the client device 106 is not included in the list of authorized devices 219 for the account 206, then the synchronization application 109 may determine that the update to the account 206 is invalid. In various embodiments, the synchronization application 109 may compare a cookie, UUID, GUID, or similar identifier provided by the authentication application 119 executing on the client device to a set of cookies, UUIDs, GUIDs, or similar identifiers identified in the list of authorized devices 219 for the account 206. If the cookie, UUID, GUID, or similar identifier is not included in the list of authorized devices 219 for the account 206, then the synchronization application may determine that the update to the account 206 is invalid. The synchronization application 109 may also make additional checks to determine whether the update to the account 206 provided by the authentication application 119 is valid. If the update provided by the authentication application is valid, then execution proceeds to box 406. Otherwise, the previously described path of execution of the synchronization application 109 subsequently ends.

Proceeding next to box 406, the synchronization application 109 determines whether there are any differences between the data included in the update to the account 206 and the data for the account 206 stored in the data store 113. For example, two or more instances of the authentication application 119 on two or more different client devices 106 may be reporting the same update because the changes to the two different client devices 106 were made concurrently or nearly concurrently. The synchronization application 109 may for example, identify whether the certificates 123 identified in the update to be added to the account 206 are already stored in the data store 113. Similarly, the synchronization application may, for example, identify whether certificates 123 marked for removal have already been removed from the data store 113. Similar determinations may be made for updates to authentication state 209 and authentication credentials 213. If there are no differences between the update received from the authentication application 119 and the account 206 in the data store 113, then the synchronization application 109 may determine that no update to the account 206 is necessary. If there are differences between the update received from the authentication application 119 and the account 206 in the data store 113, then the synchronization application 109 may determine that an update to the account 206 is necessary. If an update is necessary, then execution proceeds to box 409. If no update is necessary, then the previously described path of execution of the synchronization application 109 subsequently ends.

Moving on to box 409, the synchronization application 109 updates the account 206 to reflect the changes included in the update received from the authentication application 119. The synchronization application 109 may, for example, execute or process a structured query language (SQL) statement, create a replacement key-value pair to reflect the additional data, and/or perform other similar data operations to update the record for the account 206 in the data store 113 (FIGS. 1 & 2) to reflect the changes in the update received from the client computing device 106. Execution of the previously described path of execution subsequently ends.

Figure 5:
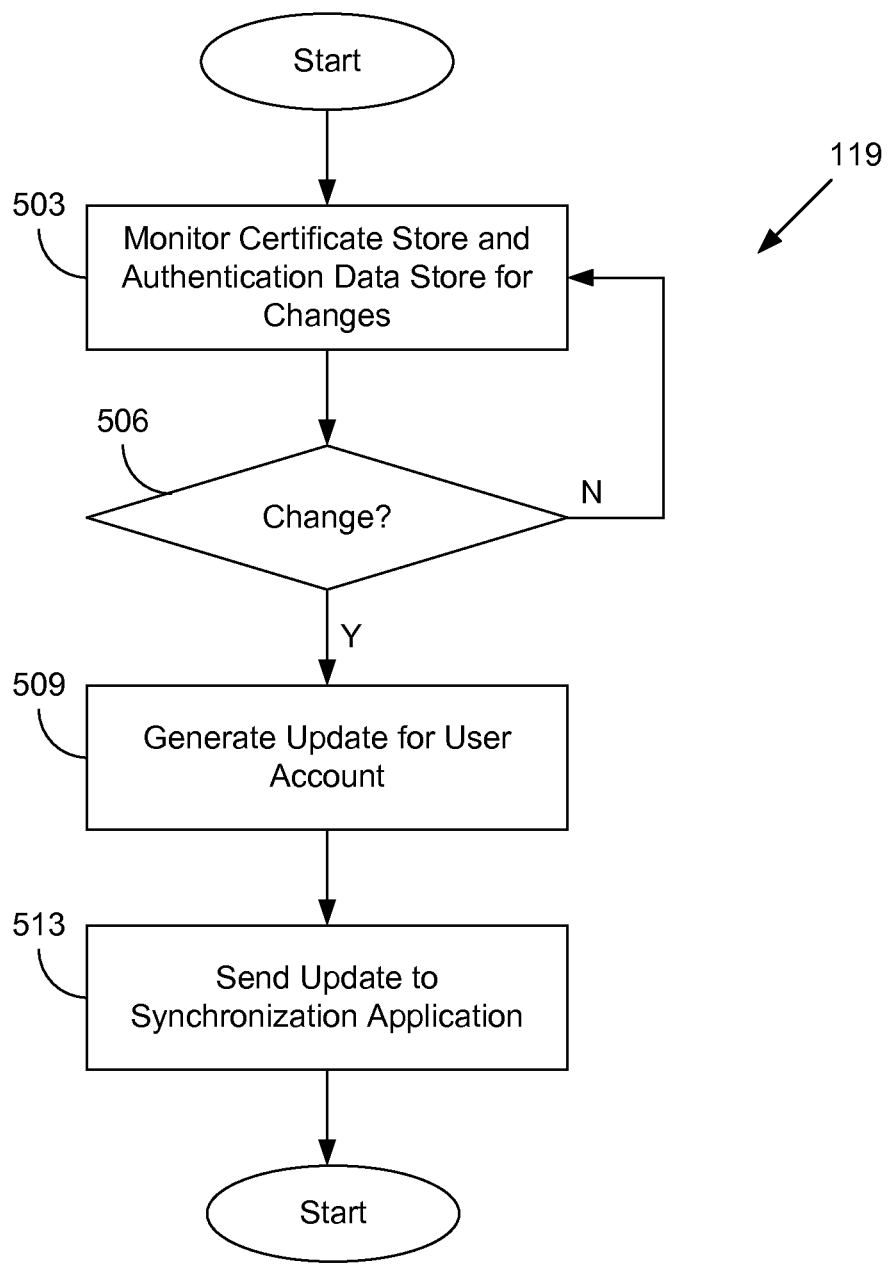
FIG. 5 is a flowchart illustrating one example of functionality implemented as portions of an application executed in a client device in the networked environment of FIG. 2 according to various embodiments of the present disclosure.

Referring next to FIG. 5, shown is a flowchart that provides one example of the operation of a portion of the authentication application 119 according to various embodiments. It is understood that the flowchart of FIG. 5 provides merely an example of the many different types of functional arrangements that may be employed to implement the operation of the portion of the authentication application 119 as described herein. As an alternative, the flowchart of FIG. 5 may be viewed as depicting an example of elements of a method implemented in the client device 106 (FIGS. 1 & 2) according to one or more embodiments.

Beginning with box 503, the authentication application 119 monitors the certificate store 116 (FIGS. 1 & 2) and authentication data store 229 (FIGS. 1 & 2) for changes to data stored in the certificate store 116 and/or the authentication data store 229. The authentication application 119 may, for example, repeatedly query or check the status or state of the certificate store 116 and/or the authentication data store 229.

Proceeding next to box 506, the authentication application 119 determines whether a change has occurred with respect to either the certificate store 116 or the authentication data store 229. A change may include, for example, an addition of a record to the certificate store 116 or the authentication data store 229, a deletion of a record in the certificate store 116 or the authentication data store 229, a modification of a record in the certificate store 116 or the authentication data store 229, and/or other changes. The authentication application 119 may determine that the change has occurred, for example, by comparing the current state of the certificate store 116 or the authentication data store 229 to a previous state of the certificate store 116 or the authentication data store 229. For example, the authentication application 119 may compare the certificates 123 currently in the certificate store 116 with a list of certificates previously determined to be in the certificate store 116. The previous state may have been previously obtained by the authentication application 119 in response to a previous query of the certificate store 116 and/or the authentication data store 229. If no change is detected, then execution of the authentication application 119 loops back to box 503. If a change is detected, then execution of the authentication application 119 proceeds to box 509.

Referring next to box 509, the authentication application 119 generates an update for the account 206 (FIG. 2). The update may include a list of changes to the certificate store 116 and/or authentication data store 229, such as copies of certificates 123 added to the certificate store 116, copies of authentication state 209 added to the authentication data store 229, copies of authentication credentials added to the authentication data store 229, identifiers of certificates 123 removed from the certificate store 116, identifiers of authentication states 209 removed from the authentication data store 229, identifiers of authentication credentials removed from the authentication data store 229, and/or other data. The update may also, in some embodiments, be compressed, serialized, or otherwise transformed in order to facilitate transmission from the authentication application 119 to the synchronization application 109.

Moving on to box 513, the authentication application 119 sends the update to the synchronization application 109 (FIGS. 1 & 2). The update may be sent across a network 203 (FIG. 2) using any one of a number of protocols, including the hypertext transfer protocol (HTTP), the representational state transfer (REST) protocol, the file transfer protocol (FTP), the secure file transfer protocol (SFTP), and/or other data transfer protocols. To protect sensitive data included in the update, such as passwords or private cryptographic keys, the connection over which the update is sent may, in some embodiments, be encrypted using the secure sockets layer (SSL) protocol, the transport layer security (TLS) protocol, and/or similar secure transmission protocols. In some embodiments, the authentication application 119 may encrypt the update before sending it across the network 203, for example by encrypting the update according to the advanced encryption standard or using public key cryptographic approaches (e.g., the Elliptic Curve Integrated Encryption Scheme or the RSA encryption scheme). In a previously provided key may be used to encrypt the data and the synchronization application 109 may use a corresponding key to decrypt the update. After the authentication application 119 sends the update to the synchronization application 109, the previously described path of execution of the authentication application 119 ends.

Figure 6:
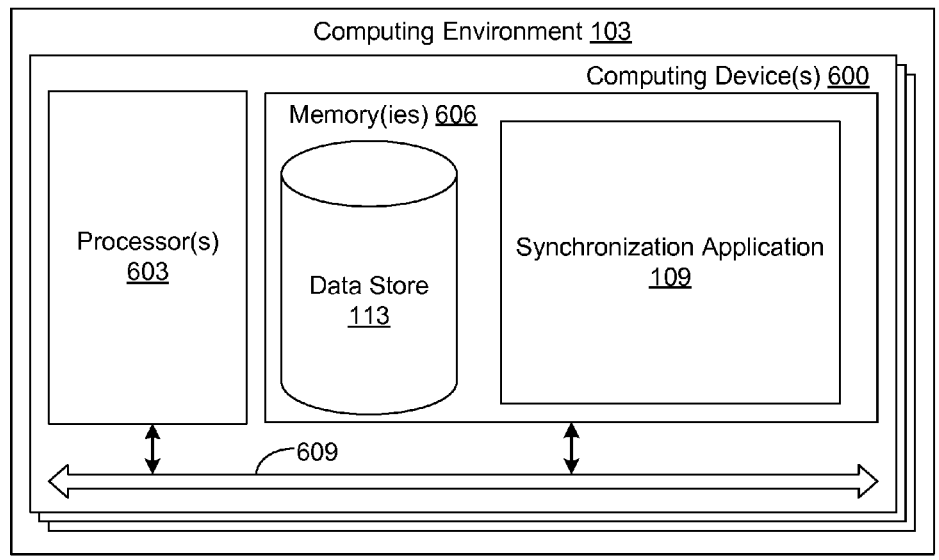
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 103 according to an embodiment of the present disclosure. The computing environment 103 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are a synchronization application 109 and potentially other applications. Also stored in the memory 606 may be a data store 113 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Figure 7:
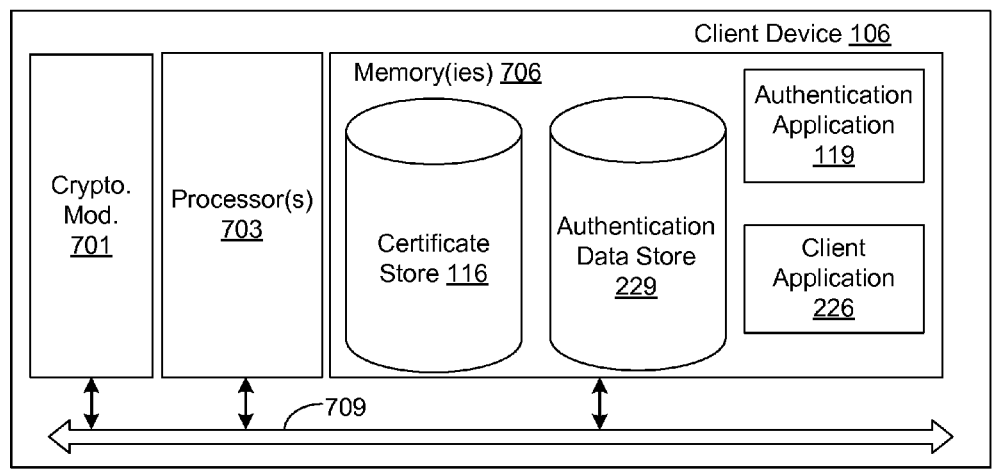
FIG. 7 is a schematic block diagram that provides one example illustration of a client device employed in the networked environment of FIG. 2 according to various embodiments of the present disclosure.

With reference to FIG. 7, shown is a schematic block diagram of the client device 106 according to an embodiment of the present disclosure. The client device 106 includes at least one processor circuit, for example, having a cryptographic module 701, a processor 703 and a memory 706, all of which are coupled to a local interface 709. The local interface 709 may comprise, for example, a data bus with an accompanying address/control bus or other bus structure as can be appreciated.

The cryptographic module 701 may correspond to a trusted platform module (TPM) or similar hardware security module. The cryptographic module 701 may include a memory subsystem, including a main random access memory (RAM) for storage of instructions and data during program execution and a read only memory (ROM), in which fixed cryptographic information may be stored, such as a hardware secret stored securely so as to be nonexportable (i.e., inaccessible through any call to the cryptographic module). The cryptographic module 701, in some embodiments, operates wholly or partly in compliance with Trusted Computing Group's TPM Main Specification level 2, Version 1.2, Revision 116, TPM Main Specification level 2, Version 1.2, Revision 103 and/or ISO/IEC 11888, which are incorporated herein by reference in their entireties. The client device 106 may also store cryptographic keys in RAM and/or processor registers for temporary cryptographic processing. The cryptographic information stored in memory 706 may be used in combination with cryptographic information obtained via the network interface and/or one or more of the user interface input devices. The one or more cryptographic processors may be used to perform cryptographic operations in the device and may include a random number generator, SHA-2 or other hash generator and an encryption-decryption-signature engine.

The one or more cryptographic processors in the cryptographic module 701 may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, Blowfish, CAST5, RC4 and the international data encryption algorithm (IDEA). Symmetric key algorithms may also include those used to generate output of one-way functions and include, but are not limited to, algorithms that utilize hash-based message authentication codes (HMACs) and message authentication codes (MACs) in general, such as PBKDF2 and Bcrypt. Asymmetric key algorithms may also include various schemes for performing cryptographic operations on data. Example algorithms include, but are not limited to, those that utilize the Diffie-Hellman key exchange protocol, the digital signature standard (DSS), the digital signature algorithm (DSA), the El-Gamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the elliptic curve Menezes-Qu-Vanstone (EC-MQV) key agreement scheme, and the elliptic curve Qu-Vanstone (ECQV) implicit certificate scheme. Other algorithms and combinations of algorithms are also considered as being within the scope of the present disclosure. Generally, one or more components of the cryptographic module may be configured to collectively perform various operations used for generating cryptographically verifiable information for security tasks.

Stored in the memory 706 are both data and several components that are executable by the processor 703. In particular, stored in the memory 706 and executable by the processor 703 are the authentication application 119, the client application 226, and potentially other applications. Also stored in the memory 706 may be a certificate store 116, and authentication data store 229, and/or other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD)

or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The processor 703 may be of electrical or of some other available construction.

Although list of main applications, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3, 4, and 5 show the functionality and operation of an implementation of portions of the synchronization application 109 and/or the authentication application 119. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computing device 600, a processor 703 in a client device 106, or other computing system. The machine code may be converted from the source code, etc. If embodied in hardware, each block may represent a circuit or a number of interconnected circuits to implement the specified logical function(s).

Although the flowcharts of FIGS. 3, 4, and 5 show a specific order of execution, it is understood that the order of execution may differ from that which is depicted. For example, the order of execution of two or more blocks may be scrambled relative to the order shown. Also, two or more blocks shown in succession in FIGS. 3, 4, and 5 may be executed concurrently or with partial concurrence. Further, in some embodiments, one or more of the blocks shown in FIGS. 3, 4, and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the synchronization application 109 and the authentication application 119, that comprises software or code can be embodied in any non-transitory computer-readable medium for use by or in connection with an instruction execution system such as, for example, a processor 603 in a computing device 600, a processor 703 in a client device 106, or other computing system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the synchronization application 109 and the authentication application 119, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600 or client device 106, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
machine readable instructions stored in the memory that, when executed by the processor, cause the computing device to at least:
detect a change to a credential store located in the computing device, wherein the credential store is configured to store at least one of a cryptographic certificate, an authentication state, or an authentication response validated by a cryptographic module of the computing device;
identify a current state of the credential store in response to installation of an application comprising the machine readable instructions;
determine a difference between the current state of the credential store and a reference state for the credential store based at least in part upon a comparison of the current state with the reference state, wherein the reference state is stored in a remote computing device;
reconcile the current state of the credential store with the reference state of the credential store based at least in part on the difference between the current state of the credential store and the reference state of the credential store; and
send an update to the remote computing device, wherein the update comprises the change to the credential store and an account identifier, wherein the account identifier uniquely identifies a storage allotment on the remote computing device for use by the application.

2. The system of claim 1, wherein the machine readable instructions, when executed by the processor, further cause the computing device to at least:
send a query to the remote computing device, wherein the query comprises the account identifier and a current state of the credential store; and
update the current state of the credential store in response to a receipt of a change set from the remote computing device, wherein the change set is received in response to the query.

3. The system of claim 1, wherein the credential store comprises a certificate store provided by an operating system of the computing device.

4. The system of claim 1, wherein the credential store comprises a previously configured location in the computing device.

5. The system of claim 1, wherein the machine readable instructions comprise a plugin for a browser and the machine readable instructions, when executed by the processor, further cause the computing device to at least:
validate a request from a network application rendered by the browser, wherein the request comprises a request for an authentication certificate located in the credential store; and
provide the authentication certificate to the browser for use with the network application in response to a determination that the request from the network application is valid.

6. The system of claim 1, wherein the machine readable instructions that cause the computing device to detect the change to the credential store located in the computing device further cause the computing device to at least:
retrieve a first list of credentials in the credential store;
retrieve a second list of credentials in the credential store after a predefined period of time has elapsed from retrieval of the first list of credentials; and
identify a difference between the first list of credentials and the second list of credentials, wherein the difference between the first list of credentials and the second list of credentials represents the change to the credential store located in the computing device.

7. The system of claim 1, wherein a certificate stored in the credential store comprises at least one of: a public key or a public key certificate.

8. A system, comprising:
a computing device comprising a processor and a memory; and
machine readable instructions stored in the memory representing a plugin for a browser that, when executed by the processor, cause the computing device to at least:
detect a change to a credential store located in the computing device, wherein the credential store is configured to store at least one of a cryptographic certificate, an authentication state, or an authentication response validated by a cryptographic module of the computing device;
validate a request from a network application rendered by the browser, wherein the request comprises a request for an authentication certificate located in the credential store;
provide the authentication certificate to the browser for use with the network application in response to a determination that the request from the network application is valid; and
send an update to a remote computing device, wherein the update comprises the change to the credential store and an account identifier, wherein the account identifier uniquely identifies a storage allotment on the remote computing device for use by the network application.

9. The system of claim 8, wherein the machine readable instructions, when executed by the processor, further cause the computing device to at least:
send a query to the remote computing device, wherein the query comprises the account identifier and a current state of the credential store; and
update the current state of the credential store in response to a receipt of a change set from the remote computing device, wherein the change set is received in response to the query.

10. The system of claim 8, wherein the machine readable instructions, when executed by the processor, further cause the computing device to at least:
identify a current state of the credential store in response to installation of the plugin;
determine a difference between the current state of the credential store and a reference state for the credential store based at least in part upon a comparison of the current state with the reference state, wherein the reference state is stored in the remote computing device; and reconcile the current state of the credential store with the reference state of the credential store based at least in part on the difference between the current state of the credential store and the reference state of the credential store.

11. The system of claim 8, wherein the credential store comprises a certificate store provided by an operating system of the computing device.

12. The system of claim 8, wherein the credential store comprises a previously configured location in the computing device.

13. The system of claim 8, wherein the machine readable instructions that cause the computing device to detect the change to the credential store located in the computing device further cause the computing device to at least:

retrieve a first list of credentials in the credential store;

retrieve a second list of credentials in the credential store after a predefined period of time has elapsed from retrieval of the first list of credentials; and identify a difference between the first list of credentials and the second list of credentials, wherein the difference between the first list of credentials and the second list of credentials represents the change to the credential store located in the computing device.

14. The system of claim 8, wherein a certificate stored in the credential store comprises at least one of: a public key or a public key certificate.

15. A system, comprising:

a computing device comprising a processor and a memory; and machine readable instructions stored in the memory that, when executed by the processor, cause the computing device to at least:

retrieve a first list of credentials in a credential store, wherein the credential store is configured to store at least one of a cryptographic certificate, an authentication state, or an authentication response validated by a cryptographic module of the computing device;

retrieve a second list of credentials in the credential store after a predefined period of time has elapsed from retrieval of the first list of credentials;

identify a difference between the first list of credentials and the second list of credentials, wherein the difference between the first list of credentials and the second list of credentials represents a change to the credential store located in the computing device; and send an update to a remote computing device, wherein the update comprises the change to the credential store and an account identifier, wherein the account identifier uniquely identifies a storage allotment on the remote computing device for use by machine readable instructions.

16. The system of claim 15, wherein the machine readable instructions, when executed by the processor, further cause the computing device to at least:

send a query to the remote computing device, wherein the query comprises the account identifier and a current state of the credential store; and update the current state of the credential store in response to a receipt of a change set from the remote computing device, wherein the change set is received in response to the query.

17. The system of claim 15, wherein the machine readable instructions, when executed by the processor, further cause the computing device to at least:

identify a current state of the credential store in response to installation of the machine readable instructions on the computing device;

determine a difference between the current state of the credential store and a reference state for the credential store based at least in part upon a comparison of the current state with the reference state, wherein the reference state is stored in the remote computing device; and reconcile the current state of the credential store with the reference state of the credential store based at least in part on the difference between the current state of the credential store and the reference state of the credential store.

18. The system of claim 15, wherein the credential store comprises a certificate store provided by an operating system of the computing device.

19. The system of claim 15, wherein the credential store comprises a previously configured location in the computing device.

20. The system of claim 15, wherein the machine readable instructions comprise a plugin for a browser and the machine readable instructions, when executed by the processor, further cause the computing device to at least:

validate a request from a network application rendered by the browser, wherein the request comprises a request for an authentication certificate located in the credential store; and provide the authentication certificate to the browser for use with the network application in response to a determination that the request from the network application is valid.

21. The system of claim 15, wherein a certificate stored in the credential store comprises at least one of: a public key or a public key certificate.

* * * * *